United States Patent [19]

Billinger et al.

[11] Patent Number: 4,769,834

[45] Date of Patent: Sep. 6, 1988

[54] INTER-EXCHANGE CARRIER ACCESS

[75] Inventors: Randy J. Billinger, Thornton; Laurel K. Dotter, Boulder; Tommy D. Gasaway, Westminster; Donna W. Herrick, Louisville; Sidney W. Johnson, Northglenn, all of Colo.

[73] Assignee: American Telephone and Telegraph Company and AT&T Information Systems Inc., Holmdel, N.J.

[21] Appl. No.: 9,178

[22] Filed: Jan. 30, 1987

[51] Int. Cl.[4] ...................... H04M 3/38; H04M 7/00; H04M 15/14; H04Q 3/78
[52] U.S. Cl. .................................. 379/112; 379/196; 379/207; 379/221; 379/245
[58] Field of Search ............... 379/221, 220, 207, 201, 379/112, 113, 127, 245, 196, 197

[56] References Cited

U.S. PATENT DOCUMENTS

| | | | |
|---|---|---|---|
| 4,565,903 | 1/1986 | Riley | 379/220 |
| 4,661,974 | 4/1987 | Bales et al. | 379/198 |
| 4,685,127 | 8/1987 | Miller et al. | 379/221 |

Primary Examiner—Thomas W. Brown
Attorney, Agent, or Firm—James M. Graziano; John C. Moran

[57] ABSTRACT

This Inter-Exchange Carrier Access arrangement uses the Automatic Number Identification (ANI) capability of the central switching office to eliminate the need for the customer to dial an authorization code when accessing an inter-exchange carrier via a facilities reseller telephone communication system. The central switching office transmits the calling party identification (ANI) digits to the facilities reseller telephone communication system when the customer dials the remote access code for the facilities reseller telephone communication system. These received ANI digits are compared by the facilities reseller telephone communication system with a list of authorized customers stored in memory. If a match occurs, the identity of the inter-exchange carrier preselected by the customer is retrieved from memory and the telephone communication system automatically outpulses the inter-exchange carrier access code to the central switching office. Once connected to the selected inter-exchange carrier, the telephone communication system completes the call by transmitting both the called number and the customer's personal identification code to the inter-exchange carrier. The customer thereby has "dial 1" access through the facilities reseller telephone communication system to this inter-exchange carrier.

6 Claims, 6 Drawing Sheets

FIG. 2

CALL PROGRESS TABLE

| IDENTIFICATION OF ASSIGNED OUTGOING TRUNK | IDENTIFICATION OF CALLING STATION (ANI) | IDENTIFICATION OF CALLED STATION | FACILITY RESTRICTION LEVEL | DURATION OF CONNECTION | AUTHOR-IZATION CODE | ACCOUNT CODE |
|---|---|---|---|---|---|---|
| 107 | 303 538 1010 | 416 273 8424 | 0 | 402 | 1471 | 4210 |
| 108 | 303 538 0122 | 212 557 1910 | 4 | 22 | 3871 | 1839 |
| 109 | 303 538 1111 | 201 222 1788 | 2 | 171 | 4553 | 9292 |
| ... | ... | ... | ... | ... | ... | ... |
| 110 | 303 538 1002 | 212 157 1111 | 6 | 43 | 6777 | 7645 |

AUTHORIZATION CODE TABLE

| DEFINED STATUS | CALLING STATION AUTHORIZATION CODE | ACCOUNT CODE LENGTH | FACILITY RESTRICTION LEVEL |
|---|---|---|---|
| 1 | 1471 | 5 | 1 |
| 2 | 1492 | 5 | 0 |
| 1 | 3871 | 5 | 1 |
| 1 | 4553 | 5 | 3 |
| 1 | 6777 | 5 | 5 |
| ... | ... | ... | ... |
| 2 | 9218 | 5 | 0 |

1 = VALID
2 = INVALID

ANI VERIFICATION TABLE

| CALLING STATION ANI | INTER-EXCHANGE CARRIER ACCESS STATUS | ACCOUNT CODE LENGTH | FACILITY RESTRICTION LEVEL |
|---|---|---|---|
| 303 538 1010 | 1 | 5 | 1 |
| 303 538 0122 | 2 | 5 | 0 |
| 303 538 1111 | 2 | 5 | 1 |
| ... | ... | ... | ... |
| 303 538 1002 | 3 | 5 | 0 |

1 = VALID ANI
2 = REQUIRES AUTHORIZATION CODE
3 = RESTRICT CALL CONNECTION

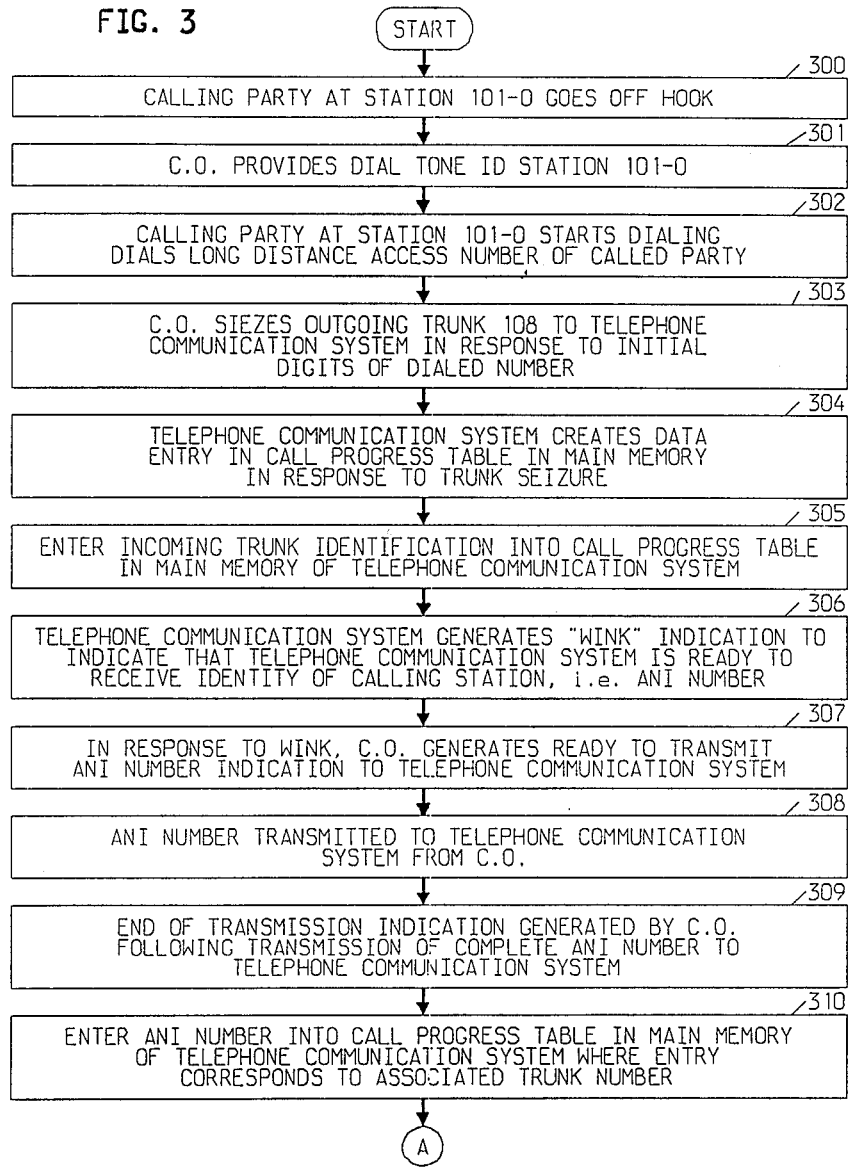

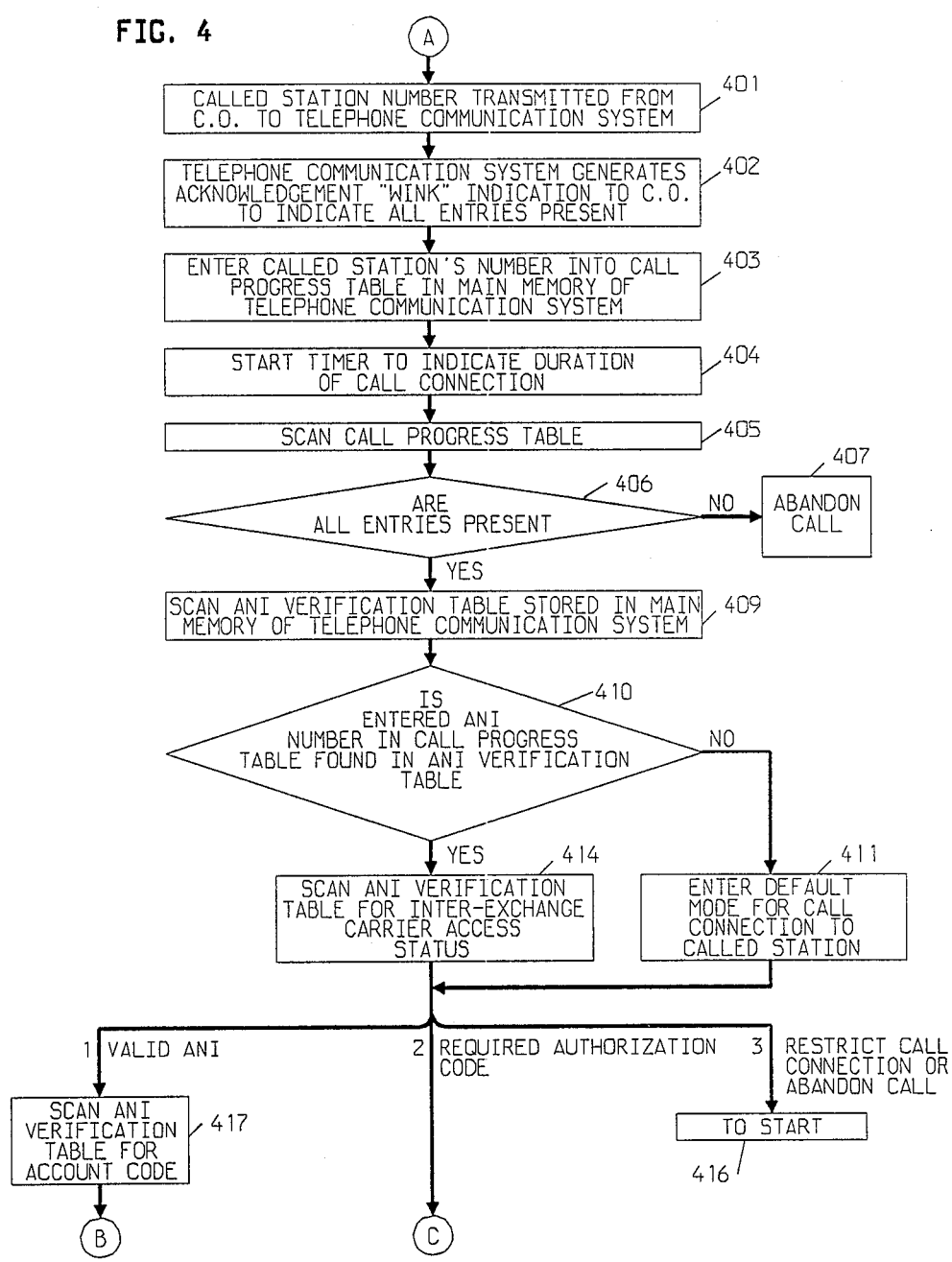

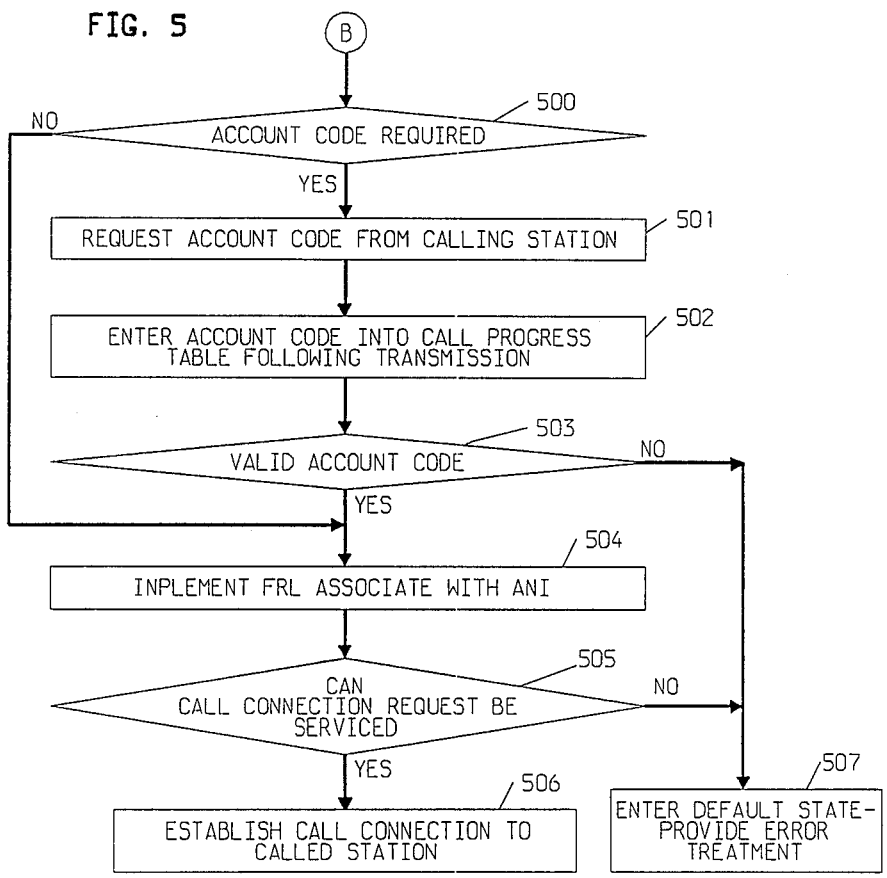

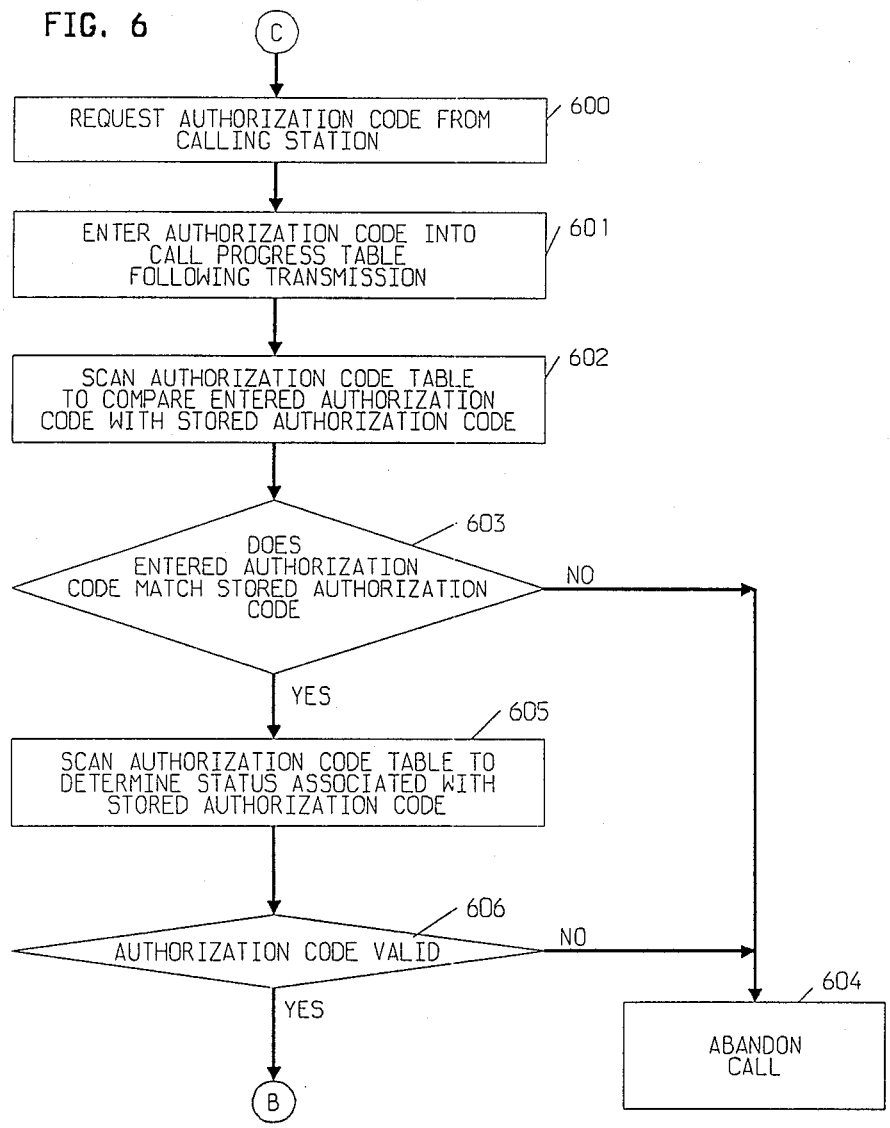

INTER-EXCHANGE CARRIER ACCESS

CROSS-REFERENCE TO RELATED APPLICATION

The following U.S. applications, which are assigned to the same assignee as the instant application and filed concurrently therewith, has related subject matter:

(1) R. J. Billinger, et al., "Communication Facilities Access Control Arrangement", Ser. No. 009,175; and (2) F. J. Bogart, et al., "Inter-Exchange Carrier Access Selection Feature for a PBX User", Ser. No. 009,174.

FIELD OF THE INVENTION

This invention relates to telephone communication systems and in particular to a facilities reseller inter-exchange carrier access control arrangement that provides "dial 1" access to any of a number of inter-exchange carriers for each station served by the facilities reseller telephone switching system.

Problem

It is a problem in telephone communication systems for facilities resellers to provide their customers with a simple method of accessing inter-exchange carrier facilities. The facilities resellers use a telephone communication system such as a PBX as the switching equipment to interface their customers with various inter-exchange carrier facilities. A customer served by a central switching office accesses the facilities reseller telephone communication system by dialing a seven or ten digit remote access code. The central switching office connects the customer to an incoming trunk on the facilities reseller telephone communication system, which then prompts the customer to dial an authorization code (usually seven digits) plus the long distance number of the called party (ten digits or more). The telephone communication system uses the authorization code to identify the customer's preferred inter-exchange carrier and complete the call to the called party via this identified inter-exchange carrier. The complexity of this arrangement and the burden on the customers in dialing 24+ digits to originate a call is a problem for facilities resellers.

Solution

This problem is solved and a technical advance achieved by the subject ANI verification feature which uses the Automatic Number Identification (ANI) capability of the central switching office to eliminate the need for the customer to dial an authorization code when accessing an inter-exchange carrier via a facilities reseller telephone communication system. The central switching office transmits the calling party identification (ANI) digits to the facilities reseller telephone communication system when the customer dials an inter-exchange call either by dialing 1+ the called number if the customer is presubscribed to the facilities reseller as an inter-exchange carrier or 1+ carrier access code + the called number if the customer selects the facilities reseller as the inter-exchange carrier for this call. These received ANI digits are compared by the facilities reseller telephone communication system with a list of authorized customers stored in memory. If a match occurs, the identity of the inter-exchange carrier preselected by the customer is retrieved from memory and the telephone communication system automatically outpulses the inter-exchange carrier access code to the central switching office Once connected to the selected inter-exchange carrier, the telephone communication system completes the call by transmitting both the called number and the customer's personal identification code to the inter-exchange carrier. The customer thereby has "dial 1" access through the facilities reseller telephone communication system to this inter-exchange carrier.

BRIEF DESCRIPTION OF THE DRAWING

These and other advantages of the invention may be better understood from a reading of the following description of one possible exemplary embodiment taken in conjunction with the drawing in which:

FIG. 2 illustrates the logical memory structure of the switch processor of the telephone communication system; and FIGS. 3-6 illustrate a flow chart which defines the call processing steps to implement the inter-exchange carrier access feature.

DETAILED DESCRIPTION

Figure 1:
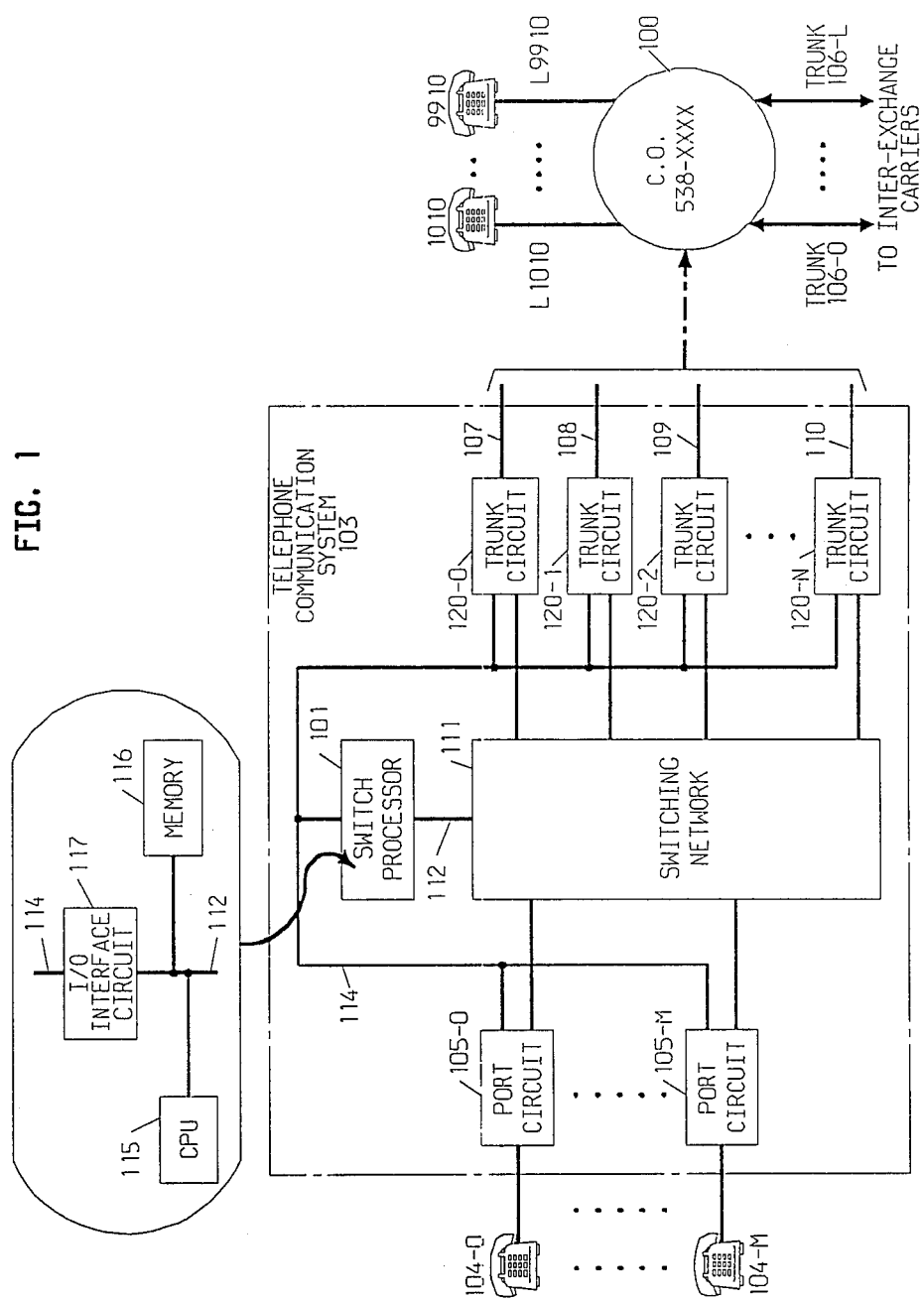
FIG. 1 illustrates a simplified block diagram of a telephone communication system.

FIG. 1 illustrates a telephone communication system 103 in block diagram form. FIG. 1 also illustrates central switching office (C.O.) 100 which serves stations 1010 through 9910 over central office lines L1010 through L9910. Central switching office 100 is designated by an area code (303) and an exchange code (538xxxx). Additionally, central switching office 100 connects via trunks 106-0 to 106-L to one or more inter-exchange carriers (not shown). Central switching office 100 also connects over trunks 107-110 to telephone communication system 103.

Telephone communication system 103 is a conventional program controlled PBX such as is known to the art. FIG. 1 illustrates a plurality of terminal equipment 104-0 to 104-M each of which is associated with a respective one of telephone communication system port circuits 105-0 to 105-M. This terminal equipment includes telephone station sets as well as digital terminal devices. Telephone communication system 103 is also equipped with a plurality of trunk circuits 107-110 which interconnect telephone communication system 103 with local central switching office 100. Telephone communication system 103 includes a switching network 111, connected to port circuits 105-0 to 105-M and to trunk circuits 120-0 to 120-N. Switch processor 101 consists of a central processing unit 115, which is a general purpose processor, and its associated memory 116. Switch processor 101 also includes a data input/output interface circuit 117, which is connected to all of port circuits 105-0 to 105-M and trunk circuits 120-0 to 120-N by bus 114. Input/output interface circuit 117 and bus 114 function to carry control signals between switch processor central processing unit 115 and port circuits (105-0 to 105-M) and trunk circuits 120-0 to 102-N. Switching network 111 functions under the control of switch processor 101 to establish communication connections among the communication devices comprising the terminal equipment and trunks by interconnecting the associated port circuits and trunk circuits.

Telephone communication system 103 can be directly connected to inter-exchange carrier trunks, tie lines, etc. (not shown) and is also connected to central switching office 100 in order to obtain access to inter-exchange and intra-exchange carriers. In order to access inter-exchange carriers via central switching office 100, telephone communication system 103 must provide an inter-exchange carrier access code to central switching office 100 which provides access to the inter-exchange carrier indicated by the access code. The inter-exchange carrier then requests the user's personal identification code and the called number in order to establish a call connection through the inter-exchange carrier that will serve the call. The process of establishing a call connection via central switching office 100 through a specified inter-exchange carrier is subsequently discussed in more detail.

Switch Processor Memory Structure

FIG. 2 discloses in tabular representation the structure of memory 116 in telephone communication system 103 which stores data relevant to the inter-exchange carrier access feature for telephone communication system 103. In particular, FIG. 2 comprises a call progress table, an ANI verification table, and an authorization code table. All the possible table entries are not shown in FIG. 2, only those entries are shown which are pertinent to the present disclosure.

The call progress table of FIG. 2 indicates the current status of a call connection as it exists between a calling station and a called station. The call progress table identifies: the calling station, the called station, the length of time that the call connection remains established, an authorization code as dialed by the calling station, and the identity of the outgoing trunk serving this call connection.

The ANI verification table maintains a list of calling party (ANI) numbers. Each ANI number of the table is associated with a particular calling party inter-exchange carrier access status. The possible inter-exchange carrier access status conditions are: the ANI is valid and the calling party is not required to dial an authorization code, the ANI is valid and the calling party is required to dial an authorization code, the call connection is to be restricted.

The authorization code table provides a list of authorization codes and an indication of the validity or invalidity of each authorization code. In particular a one stored in the authorization code table indicates that the associated authorization code is valid, while a two indicates an invalid authorization code.

Call Origination

FIGS. 3 through 6 provide in flow chart form the steps required to implement the inter-exchange carrier access feature. At step 300 a calling party, such as a subscriber at telephone station set 1010, which is served by central switching office 100, goes offhook. In response to the offhook condition of telephone station set 1010, central switching office 100 provides dial tone to the subscriber at telephone station set 1010 via path L1010 at step 301. In response to the received dial tone the calling party at telephone station set 1010 dials (step 302) an inter-exchange call. The subscriber can be pre-subscribed to an inter-exchange carrier, in which case the subscriber dials 1+ called number. If the subscriber is not presubscribed or wishes to override the presubscription choice, the subscriber dials 1+ inter-exchange carrier access code + called number. Assume that the subscriber selects the inter-exchange carrier by dialing an inter-exchange carrier access code which identifies the facilities reseller telephone communication system 103. Central switching office 100 at step 303 responds to the calling party's dialing of this inter-exchange call by seizing one of trunks 107 to 110 to connect the calling party with the facility reseller telephone communication system 103.

Assume for the purpose of this description that central switching office 100 seizes trunk 107. A seizure of trunk 107 by central switching office 100 is detected by trunk circuit 120-0 in telephone communication system 103. The incoming call connection from central switching office 100 to telephone communication system 103 via trunk 107 is detected by central processing unit 115 as part of the periodic scans of port circuits 105-0 to 105-M and trunk circuits 120-0 to 120-N by central processing unit 115. At step 304, central processing unit 115 creates an entry in the call progress table stored in memory 116. This entry indicates the identification of the trunk (107) serving this incoming call. At step 306, central processing unit 115 transmits control signals via input/output interface circuit 117 and bus 114 to trunk circuit 120-0 to indicate that telephone communication system 103 is ready to receive the calling party identification information. These control signals cause trunk circuit 120-0 to transmit a wink signal to central switching office 100 over trunk 107 to indicate that telephone communication system 103 is ready to receive the calling party identification. At step 307, central switching office 100 responds to the wink signal by transmitting over trunk 107 a ready to transmit ANI number indication to trunk circuit 120-0. At step 308, central switching office 100 transmits the calling party identification, which consists of the ANI number (5381010), to telephone communication system 103. At step 309, central switching office 100 transmits an end of transmission indication to alert telephone communication system 103 that the complete calling party identification (the ANI number) has been transmitted to telephone communication system 103. At step 310, central processing unit 115 stores the received ANI number (5381010) as obtained from trunk circuit 120-0 via input/output interface circuit 117 and bus 114, into the call progress table of memory 116. The identification of calling station (ANI) entry associated with incoming trunk 107 now contains the identification of the calling party.

At step 302, the calling party at telephone station set 1010 dialed the number of the called party (ex 416-2738424). The digits dialed by the calling party are transmitted by central switching office 100 over trunk 107 to telephone communication system 103 where these dialed digits are received in well-known fashion at step 401. At step 402, central processing unit 115 signals trunk circuit 120-0 via input/output interface circuit 117 and bus 114 to transmit a 'wink' acknowledgement signal to central switching office 100 over trunk 107 to indicate that all the entries have been received by telephone communication system 103. Central switching office 100 responds to the wink signal with an end of transmission signal. At step 403, central processing unit 115 enters the dialed digits in the call progress table of memory 116. In addition to the number of the called station, central processing unit 115 at step 403 adds a time stamp in the call progress table to indicate the month, day and year that the call is placed to the called party by the calling station. In addition, a timer is started at step 404 to indicate the duration of this call connection between the calling and the called parties for billing purposes. At step 405, central processing unit 115 scans the call progress table in memory 116 to determine whether all the required data entries are present for this call. If the calling or called station identification is missing or if a call restriction signal is included in the received ANI number, central processing unit 115 proceeds to step 407 and abandons this call connection. Assume for the purpose of this description that all the required data entries are present in the call progress table in memory 116.

ANI Verification Table

At step 409, central processing unit 115 scans the ANI verification table in memory 116 to determine whether the calling party has the proper authorization to originate a call to the called party. At step 410, central processing unit 115 determines whether the calling party number is listed in the ANI verification table. If the calling party number is not found in the ANI verification table, central processing unit 115 proceeds to step 411 and enters a default mode for the call connection to the called party. Central processing unit 115 assigns one of the three possible inter-exchange carrier access status digits described below, along with a facility restriction level and an account code length descriptor. Call processing then proceeds to the juncture of the three branches shown below step 414 in FIG. 4. If however the calling party ANI number is found in the ANI verification table, central processing unit 115 proceeds to step 414 to determine from the ANI verification table the inter-exchange carrier access status stored for the calling party.

There are three choices listed in the ANI verification table for inter-exchange carrier access status for the calling party. A 1 entry in the ANI verification table indicates that the calling station ANI is a valid number to be served by telephone communication system 103 without requiring an authorization code. A 2 entered in the ANI verification table indicates that an authorization code is required from the calling party before a call is placed to the called party. A 3 entered into the ANI verification table indicates that this call connection should be restricted because the calling party is not authorized to place any toll calls through telephone communication system 103. If a 3 has been found by central processing unit 115 in the ANI verification table in the defined status entry associated with the calling party ANI, the call connection is restricted and appropriate reorder tone signal or recorded announcement is provided to the calling party at step 416.

If central processing unit 115 determines the inter-exchange carrier access status entered in the ANI verification table for the calling party ANI number is a 1, then this ANI is a valid number and the calling party is not required to provide an authorization code. Central processing unit 115 determines the facility restriction level and account code length at step 417 from the ANI verification table. Call processing now proceeds to step 500 on FIG. 5 where central processing unit 115 determines whether an account code is required for the calling party as noted in the ANI verification table under the account code entry with respect to the calling party ANI. If an account code is not required, call processing proceeds to step 504. It is assumed however for the purpose of this discussion that an account code is required from the calling party. Central processing unit 115 proceeds to step 501 where an indication is provided to the calling party via the existing call connection that an account code must be entered by the calling party before call processing will proceed further. Assume that the calling party at telephone station set 1010 enters an appropriate account code (4210) via the existing call connection. Central processing unit 115 at step 502 enters the received account code into the call progress table shown in FIG. 2. Central processing unit 115 at step 503 compares the dialed account code (4210) in the call progress table with the account code length listed in the ANI verification table for the calling party to determine whether the dialed account code matches the designated account code length. If the dialed account code does not match the account code length stored in the ANI verification table for the calling party, central processing unit 115 proceeds to step 507 and enters a default state to provide reorder tone or a recorded announcement to the calling party at telephone station set 1010 to indicate that the dialed account code does not match the designated account code length stored in the ANI verification table for the calling party.

Assume for the purpose of this description that the dialed account code as stored in the call progress table matches the account code length stored in the ANI verification table. Central processing unit 115 proceeds to step 504 to implement the facility restriction level associated with the calling party. At step 505, central processing unit 115 determines whether the facility restriction level entered in the ANI verification table for the calling party indicates that this call connection can be extended to the called party identified by the dialed digits. If a 0 is entered in the facility restriction level entry for the calling party, then central processing unit 115 proceeds at step 506 to establish the call connection to the called station.

Call Connection

Central processing unit 115 advances to step 508 and establishes a call connection between the calling and called stations. As was previously discussed, this can be accomplished by accessing inter-exchange trunks or tie trunks directly connected to telephone communication system 103 or by dialing through central switching office 100 to access inter-exchange carrier trunks 106-0 to 106-L. Assume that the central switching office access is used to serve this call. This is accomplished in well-known fashion by telephone communication system 103 seizing an idle outgoing trunk (ex-110) to central switching office 100. In response to dial tone from central switching office 100, telephone communication system outpulses an inter-exchange carrier access code over trunk 110 to obtain access to one of trunks 106-0 to 106-L in central switching office 100 to an inter-exchange carrier. Once an inter-exchange carrier trunk is seized, telephone communication system 103 outpulses the called party number to the inter-exchange carrier and establishes a connection in switching network 111 between the trunk (107) serving the calling party (5381010) and this inter-exchange carrier trunk.

Authorization Code

If, at step 414, central processing unit 115 determines the inter-exchange carrier access status entered in the ANI verification table is a 2, then this ANI is a valid number and the calling party is required to provide an authorization code.

At step 600, telephone communication system 103 requests an authorization code from the calling station. The authorization code (1471) received from the calling station is entered into the call progress table at step 601.

In response to the receipt of the authorization code and the entering of the authorization code into the call progress table, central processing unit 115 scans the authorization code table at step 602 to compare the entered authorization code with the stored authorization codes. Call processing then advances to step 603. At step 603 central processing unit 115 determines whether the authorization code entered into the call progress table matches any one of the stored authorization codes. If the authorization code received from the calling station matches one of the stored authorization codes on the authorization code table, central processing unit 115 proceeds to step 605 and scans the authorization code table to determine the status of the authorization code. If the status of the authorization code at step 605 is valid, call processing advances to step B of FIG. 5 and steps 500 through 506 are repeated in order to determine whether a call may be established a calling and a called station. Steps 500 through 506 were previously described and therefore will not be described in detail here.

If either the authorization code dialed by the calling party at step 603 did not match a stored authorization code or even if they did match, it was determined at step 605 that the authorization code was not valid, then call processing advances to step 604 where the call is terminated.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a switching system, which is connected to a central switching office, which central switching office serves a plurality of inter-exchange carriers, a method of providing a calling party at a calling station on an incoming call connection through said central switching office to said switching system with dial 1 access to a preselected one of said inter-exchange carriers via said switching system, comprising the steps of:
   receiving from said central switching office data identifying said calling station;
   recording a called number dialed by said calling station and transmitted by said central switching office over said incoming call connection;
   scanning a database in said switching system to determine the one of said inter-exchange carriers preselected by said calling station;
   retrieving from said database, inter-exchange carrier access code associated with said preselected inter-exchange carrier; and
   establishing a call connection from said incoming call connection through said switching system to said preselected inter-exchange carrier via said central switching office using said retrieved access code and said called number.

2. The method of claim 1 wherein the step of retrieving includes the steps of:
   prompting said calling party over said incoming call connection to transmit authorization code data; and
   comparing said authorization code data transmitted by said calling party with authorization code data stored in said database to validate the identity of said calling party.

3. The method of claim 1 wherein said step of retrieving includes the steps of:
   prompting said calling party over said incoming call connection to provide authorization code and account code data; and
   comparing said authorization code and account code data received from said calling party over said incoming call connection with authorization code and account code data stored in said database to validate the identity of said calling party.

4. In a switching system, which is connected to a central switching office, which central switching office serves a plurality of inter-exchange carriers, apparatus for providing a calling party at a calling station on an incoming call connection through said central switching office to said switching system with dial 1 access to a preselected one of said inter-exchange carriers via said switching system, comprising:
   means for receiving from said central switching office data identifying said calling station;
   means for recording a called number dialed by said calling station and transmitted by said central switching office over said incoming call connection;
   means for scanning a database in said switching system to determine the one of said inter-exchange carriers preselected by said calling station;
   means for retrieving from said database, inter-exchange carrier access code data associated with said preselected inter-exchange carrier; and
   means for establishing a call connection from said incoming call connection through said switching system to said preselected inter-exchange carrier via said central switching office using said retrieved access code and said called number.

5. The apparatus of claim 4 wherein said retrieving means includes:
   means for prompting said calling party over said incoming call connection to transmit authorization code data; and
   means for comparing said authorization code data transmitted by said calling party with authorization code data stored in said database to validate the identity of said calling party.

6. The apparatus of claim 5 wherein said retrieving means includes:
   means for prompting said calling party over said incoming call connection to provide authorization code and account code data; and
   means responsive to authorization code and account code data transmitted by said calling party over said incoming call connection for comparing said authorization code and account code data received from said calling party and authorization code and account code data stored in said database to validate the identity of said calling party.

* * * * *